(12) United States Patent
Liang et al.

(10) Patent No.: US 7,672,449 B2
(45) Date of Patent: Mar. 2, 2010

(54) MULTIMODE XDSL LINE CARD ADAPTIVE ACTIVATION METHOD AND ITS SYSTEM

(75) Inventors: Yong Liang, Shenzhen (CN); Haihong Wei, Shenzhen (CN); Binfeng Wang, Shenzhen (CN); Xinjun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 492 days.

(21) Appl. No.: 11/611,086

(22) Filed: Dec. 14, 2006

(65) Prior Publication Data

US 2008/0037584 A1 Feb. 14, 2008

(30) Foreign Application Priority Data

May 16, 2006 (CN) .................. 2006 1 0081314

(51) Int. Cl.
*H04M 1/00* (2006.01)
(52) U.S. Cl. .................. 379/413.03; 455/552.1
(58) Field of Classification Search ........... 370/351, 370/389, 419, 464, 465, 468, 357, 359, 431, 370/463; 379/399.01, 402, 404, 413.02, 379/413.03, 413.04, 399.02; 455/73, 550.1, 455/552.1, 555; 709/230, 232, 233, 237
See application file for complete search history.

(56) References Cited

U.S. PATENT DOCUMENTS 6,067,316 A 5/2000 Amrany et al.
6,874,041 B1 3/2005 Burd et al.
6,898,280 B1 * 5/2005 Dombkowski et al. . 379/399.01
2003/0073458 A1 * 4/2003 Walston et al. .............. 455/552

FOREIGN PATENT DOCUMENTS

| CN | 1359224 | 7/2002 |
|---|---|---|
| CN | 1741465 | 3/2006 |
| EP | 1 133 137 A2 | 9/2001 |
| EP | 1 207 673 A | 5/2002 |

OTHER PUBLICATIONS

European Search Report for EP Application No. 07002659.6-1249, dated Oct. 11, 2007, 7 pages total.

* cited by examiner

*Primary Examiner*—Seema S Rao
*Assistant Examiner*—Khoa Huynh
(74) *Attorney, Agent, or Firm*—Townsend and Townsend and Crew LLP (57) ABSTRACT

This invention presents a multimode xDSL line card adaptive activation method, comprising the following steps: A) A master controller is installed and configured with multiple templates based on the modes of operation supported by a line card, and forwards templates to said line card; B) The line card receives templates forwarded by the master controller and activates the line card communications chip; C) The communications chip communicates with the remote CPE and decides on a mode of operation according to a handshake protocol; D) The line card employs a corresponding template according to the mode of operation chosen in Step C, and practices circuit activation with the CPE. This invention solves the existing problems in current multimode xDSL technology of poor compatibility and inability to adapt effectively.

9 Claims, 7 Drawing Sheets

MULTIMODE XDSL LINE CARD ADAPTIVE ACTIVATION METHOD AND ITS SYSTEM

CROSS-REFERENCES TO RELATED APPLICATIONS

The present application claims priority to Chinese Patent Application No. 200610081314.4, filed May 16, 2006, commonly assigned, incorporated by reference herein for all purposes.

BACKGROUND OF THE INVENTION

This invention involves a type of xDSL adaptive mode activation technology, particularly referring to a type of multimode xDSL line card adaptive activation method and its system.

xDSL technology is a type of high speed data transmission technology over telephone twisted pair (Unshielded Twisted Pair) cable. Apart from IDSL, SHDSL and other baseband transmission DSL, bandpass transmitted xDSL utilize frequency division multiplexing technology allowing xDSL and plain old telephone services (POTS) to share the same twisted pair. xDSL occupies high frequencies while POTS occupies the baseband portion below 4 KHz; the POTS signal and xDSL signal are separated using a splitter. Bandpass transmitted xDSL uses discrete multitone (DMT) transmission.

Figure 1:
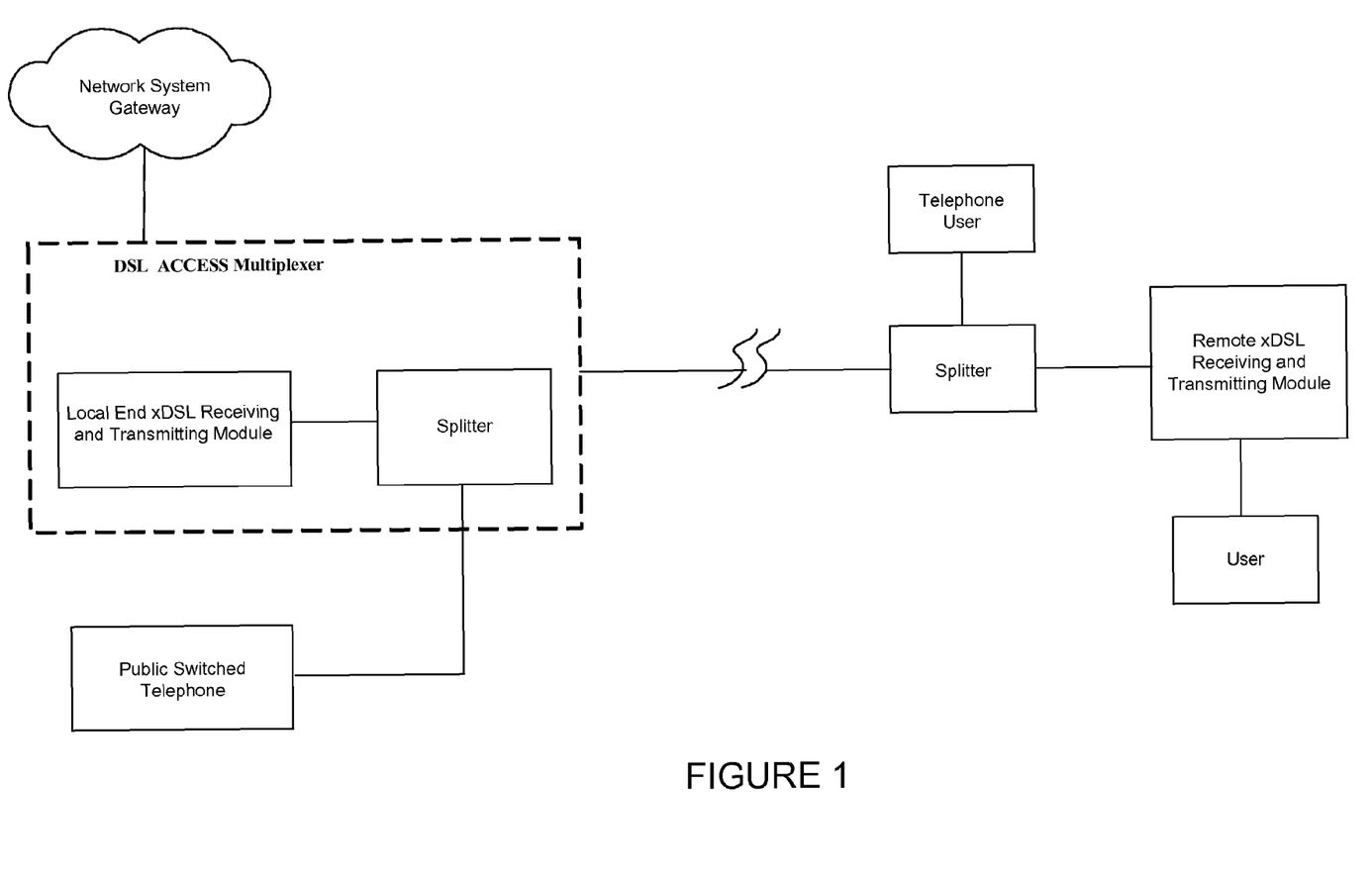
FIG. 1 is a reference model of existing xDSL system technology.

Systems which offer multiple circuit xDSL access are called a DSL access multiplexer (DSLAM); its system reference model is shown in FIG. 1.

Current xDSL has become a group of standards including a variety of technical standards providing different access speeds, scopes of coverage and target applications. Moreover, the same standard often has different appendices set up for different areas of application requirement. Furthermore, xDSL technology has developed rapidly, from the use of ADSL to the rise of ADSL2+, all the way to the mature commercial application of VDSL2 technology. This has resulted in the emergence of an era where ADSL, ADSL2+ and VDSL2 all coexist among local end equipment. However, existing ADSL and ADSL2+ remote CPE (Customer Premises Equipment) may still need to be used. Due to the vast differences between ADSL, ADSL2+ and VDSL2 technology, not just in terms of speed (the maximum download speed of ADSL is 8M, ADSL2+ is 24M and VDSL can reach speeds close to 100M), but also in terms of certain characteristic parameters, such as PSD Shaping (Power Spectrum Density Shaping), Notch, etc., in order to successfully implement the coexistence of multimode xDSL equipment, new office end equipment must be compatible with old modes, i.e. able to support a variety of xDSL modes.

In view of the aforementioned circumstances, during application of the existing technology, situations will occur where a VDSL2 line card is used to activate a remote end ADSL/ADSL2+ CPE. Although the line card is compatible with ADSL/ADSL2+ and other standards, because the line card end does not know what type of remote CPE is being used and the forwarded template is merely a general purpose VDSL2 template, this will render the activated CPE useless, thereby having a significantly negative effect on the performance of services.

BRIEF SUMMARY OF THE INVENTION

This invention presents a multimode xDSL line card adaptive activation method and system used to solve the existing problems in current multimode xDSL technology of poor compatibility and inability to adapt effectively.

This invention presents a multimode xDSL line card adaptive activation method comprising the following steps:

A) A master controller is installed with multiple templates based on the modes of operation supported by a line card, and forwards templates to the line card;

B) The line card receives templates forwarded by the master controller and activates the line card's communications chip;

C) The communications chip communicates with remote CPE and decides upon a mode of operation for activation according to a handshake protocol;

D) The line card employs a corresponding template according to the mode of operation chosen in Step C, and practices circuit activation with the CPE.

In step B of this method:

When the line card described has sufficient storage space, the central control module of said line card transfers all templates received to the line card communications chip and activates said communications chip.

In step B of this method:

When the line card described has limited storage space, the central control module of said line card forwards at least one of the multiple templates received to the line card communications chip and activates said communications chip.

In between steps B and C of this method comprises:

C1) The communications chip described reports the activated operating mode chosen in step C to the line card Central control module described;

C2) The Central control module described forwards the corresponding template for said mode to the communications chip described, according to the activated operating mode, and reactivates said communications chip.

This invention also presents a multimode xDSL master controller, comprising:

Template Creation Module, used to create multimode xDSL line card template information corresponding to each mode of operation;

Template Transmission Module, used to transmit template information created by the template creation module and activate the line card.

This invention also presents a multimode xDSL line card comprising a central control module and communications module, of which the:

The Central Control Module is used to receive template information forwarded by a master controller and generate activation orders to send to the communications chip;

The Communications Chip is used to activate according to the central control module's activation order and communicate with the remote CPE to determine which template information to apply.

Said central control module comprises:

Template Information Receiving Module, used to receive template information forwarded by a master controller;

Template Information Storage Module, used to store template information received by the template information receiving module;

Template Forwarding Module generates activation orders according to the communications chip storage space and forwards received template information;

Activation Order Forwarding Module, used to receive activation orders generated by the template forwarding module and forward said activation orders.

Said central control module also comprises:

Reported Information Receiving Module, used to receive operating mode information reported by the communications chip;

Operating Mode Appraisal Module, used to appraise the operating mode activated by the communications chip according to the operating mode information received by the reported information receiving module, and obtain the corresponding template information for said operating mode from the template information storage module; said template is then forwarded to the communications chip by the template forwarding module.

Said Template Forwarding Module comprises:

Template Forwarding Module One, used to forward all template information to the communications chip described when the communications chip has sufficient storage space, as well as generate activation orders;

Template Forwarding Module Two, used to forward at least one set of template information to the communications chip described when the communications chip has limited storage space, as well as generate activation orders.

Said Communications Chip comprises:

Handshake Module, used to handshake and negotiate with the remote CPE described, and determine the operating mode to activate;

Communications Module, used to implement communication services with the remote CPE described;

Storage Module, used to store template information forwarded by the central control module.

This invention also presents a multimode xDSL line card adaptive activation system, comprising an xDSL transmitter receiver device and remote CPE; said xDSL transmitter receiver is composed with the aforementioned master controller and the aforementioned line card.

The beneficial effects of this invention are as follows:

In the scheme described in this invention the master controller creates multiple templates according to the operating modes supported by the line card and forwards said templates to the line card. After this, the line card communications chip (line card output port) is activated according to an activation protocol. When the remote end already has a working CPE, the chip successively begins the activation process. The line card decides upon the final mode of operation activated by obtaining the mode types supported by the remote CPE and performing handshake negotiation with the remote CPE, thereby causing the template corresponding to said mode of operation to take effect. The activated mode and parameters are made consistent, thus causing intercompatability and effective adaptation for a variety of xDSL modes, expediency for both the network side and user side, and reduced costs.

DETAILED DESCRIPTION OF THE INVENTION

Embodiments for Implementation

Figure 2:
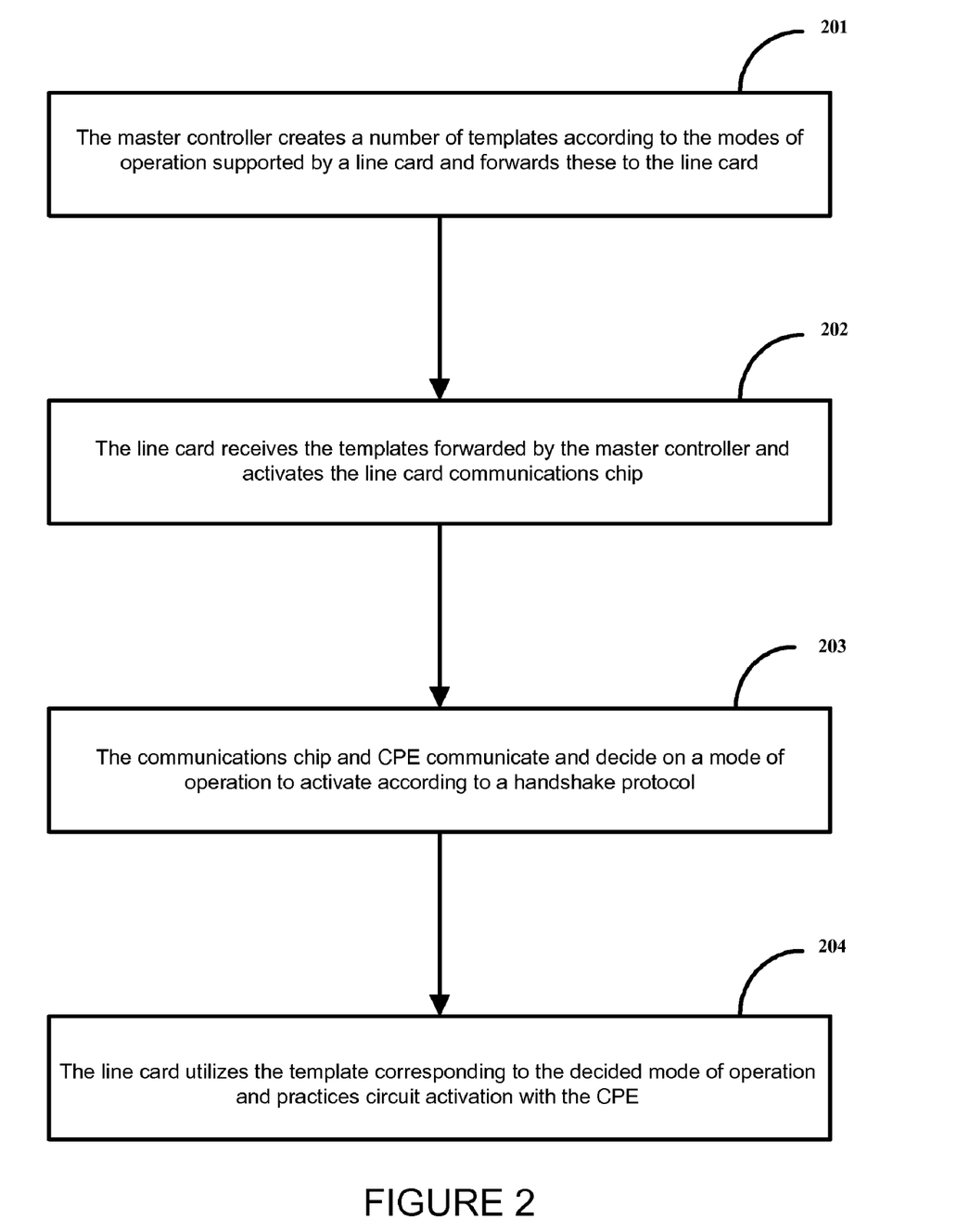
FIG. 2 is a process flow diagram of this invention.

This invention provides a multimode xDSL line card adaptive activation method; see FIG. 2 for the specific process of this method:

201) A master controller is installed with multiple templates based on the modes of operation supported by a line card and forwards said templates to the line card;

202) The line card receives the templates forwarded by the master controller and activates the line card communications chip;

203) The communications chip communicates with the remote CPE and decides upon a mode of operation according to a handshake protocol;

204) The line card utilizes the corresponding template according to the chosen mode of operation and practices circuit activation with the CPE, and then implements normal communication service operation.

Therein, in step 201, the multiple templates created by the central controller correspond to templates for a variety of xDSL operating modes and can include a public template. Said public template extracts the common parameters from many special templates corresponding to a variety of xDSL operating modes to form a common template. This improves system operating efficiency. Therein, in step 201, the common parameters from a number of special templates are extracted to form a common template. This improves system operating efficiency. In said step 201, template creation can use existing creation methods, such as, if the line cards controlled by a master controller support xDSL modes of operation such as ADSL, ADSL2+, VDSL etc., the master controller can accordingly create multiple templates, such as an ADSL template, ADSL2+ template, VDSL template etc., then a suitable template for the directed operating mode is selected through the following steps. During actual operation, the master controller can create special templates prepared for each compatibility mode dependent on its particular characteristics and having specific standards and parameters. That is, ADSL, ADSL2+ and VDSL templates, as well as a common template. The common template comprises certain shared parameters and standards from a number of special templates, such as ADSL, ADSL2+, VDSL etc. In this way, repetition of parameter allocation is avoided during template creation and later adaptation. After creating these templates, the master controller identifies them to facilitate identification during handshake negotiation with the CPE.

In step 202, once the line card receives the templates forwarded by the master controller, the line card central control module temporarily stores the templates received and forwards templates according to the storage space in the line card communications chip: when the line card communications chip has sufficient storage space, the central control module described forwards all the received templates to the communications chip and activates said line card's communications chip. Implementing step 203, said communications chip and the remote CPE carry out handshake negotiation and decide on an operating mode to activate. Implementing step 204, the line card and remote CPE practice activating the communications circuit, according to the operating mode that was decided to activate, using the corresponding template, and finally normal communications are instigated with the remote CPE.

Figure 3:
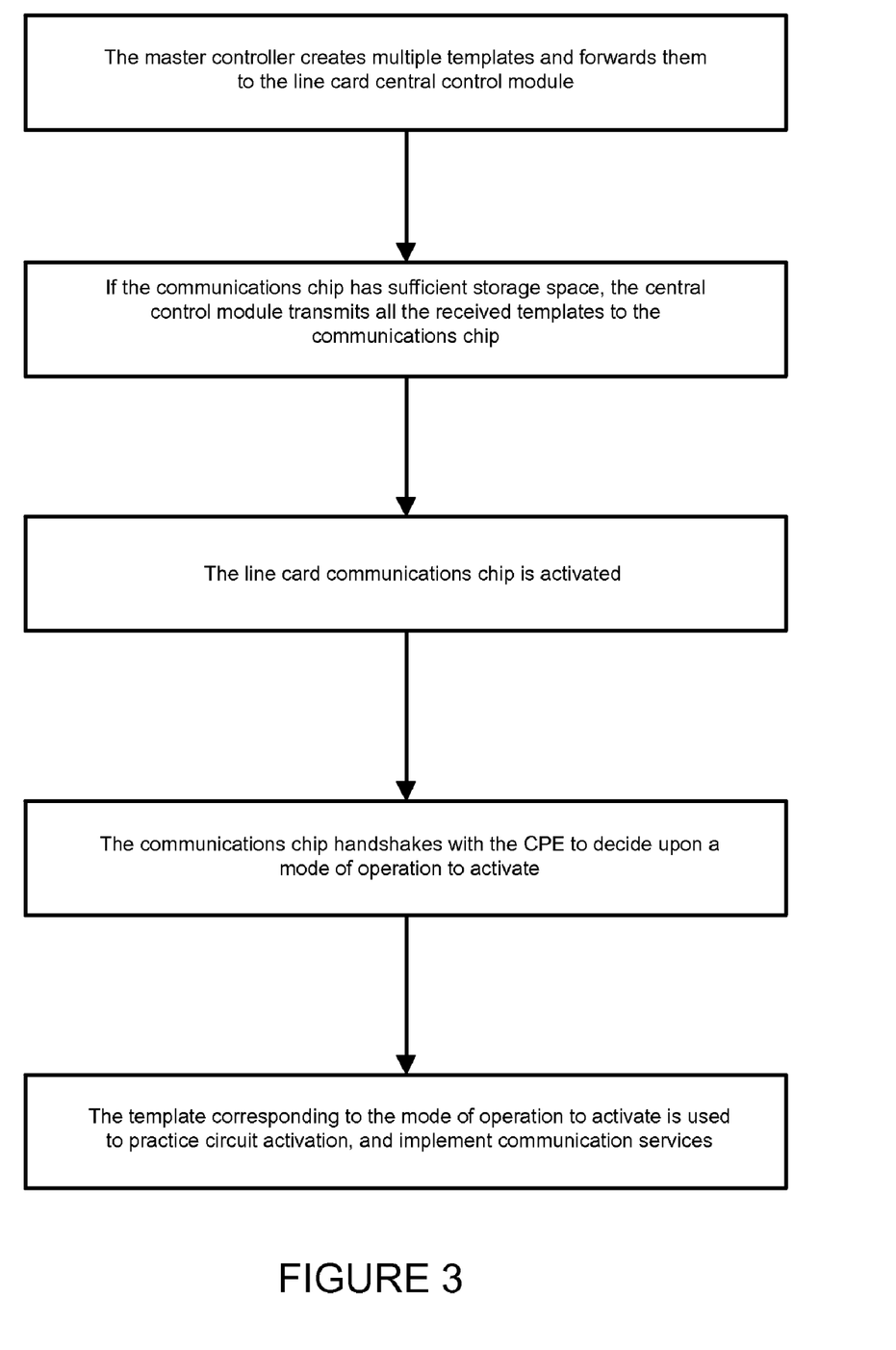
FIG. 3 is a process flow diagram for implementation example 1 of the method in this invention.

FIG. 3 illustrates the aforementioned implementation example:

In the system, the line card is compatible with three types of xDSL operating modes, accordingly the master controller can create three templates, i.e. an ADSL template, ADSL2+ template and VDSL template; the master controller forwards these three templates to the line card central control module.

Once the central control module receives the templates forwarded by the master controller, it decides if the line card communications chip has sufficient storage space and forwards the three templates simultaneously to the line card communications chip. When the remote CPE is already working, the line card communications chip and said remote CPE commence handshaking. The remote CPE requests the communications chip for an operating mode capability list and once the communications chip issues the list, the remote CPE selects a working mode (such as ADSL) according to the modes it supports (ADSL, ADSL2+ and VDSL) and the modes the communications chip supports (In this implementation example, the three modes ADSL, ADSL2+ and VDSL). Based on the G.hs handshake protocol, the remote CPE then sends MS (Mode Selection) information requesting the line card to use the ADSL operating mode. When the line card communications chip responds to said information, that is, responds that its operating mode is also ADSL, the line card and remote CPE utilize the ADSL mode (practice parameters adopt a special ADSL mode template), implement circuit activation practice and implement normal communication service. If the remote CPE sends an MR (Mode Request) request, requesting the line card to select an operating mode, once the line card communications end selects an operating mode (such as VDSL) it sends MS information notifying the remote CPE. When the CPE receives the response issued by the line card communications chip, both ends confirm the use of VDSL mode (practice parameters adopt a special VDSL mode template), implement circuit activation practice and implement normal communication service. During the handshake process, the line card and remote CPE can also send MP (Mode Proposal) information between each other to implement handshake negotiation and determine the operating mode to use. For the related handshake method, refer to specific stipulations of the G.hs handshake protocol; no further description shall be given here.

In this implementation example, the master controller can also create four templates in order to improve system efficiency, comprising a common template (comprising common parameters from the three special templates) and three special templates (ADSL, ADSL2+, VDSL); their specific adaptive activation processes are identical to that previously described; no further description shall be given here.

In addition, in step 202 of this invention's method, once the line card receives the template forwarded by the master controller, it temporarily stores the received templates and forwards them based on the available storage space in the line card communications chip; when the communications chip described has limited storage space, the central control module described forwards at least one of the received templates to the communications chip and activates said communications chip. In this step, if the master controller creates three templates, such as the ADSL, ADSL2+ and VDSL templates described in the implementation example above, it can forward one of these templates at this time. If the master control template creates four templates, such as the three special templates ADSL, ADSL2+, VDSL, and including a common template with common parameters from the three templates, at this time the central control module must forward a special template and the common template to activate said communications chip. It can also forward templates based on actual system requirements. Next, implement step 203 where said communications chip and remote CPE carry out handshake interaction to decide on an operating mode to activate. Said communications chip reports the operating mode decided to the central control module. The central control module then obtains the template corresponding to the chosen operating mode and forwards it to the communications chip described and reactivates said communications chip.

When implementing step 204, the line card and remote CPE use said template to configure the communications circuit, finally communicating with the remote CPE and establishing normal communication services.

Figure 4:
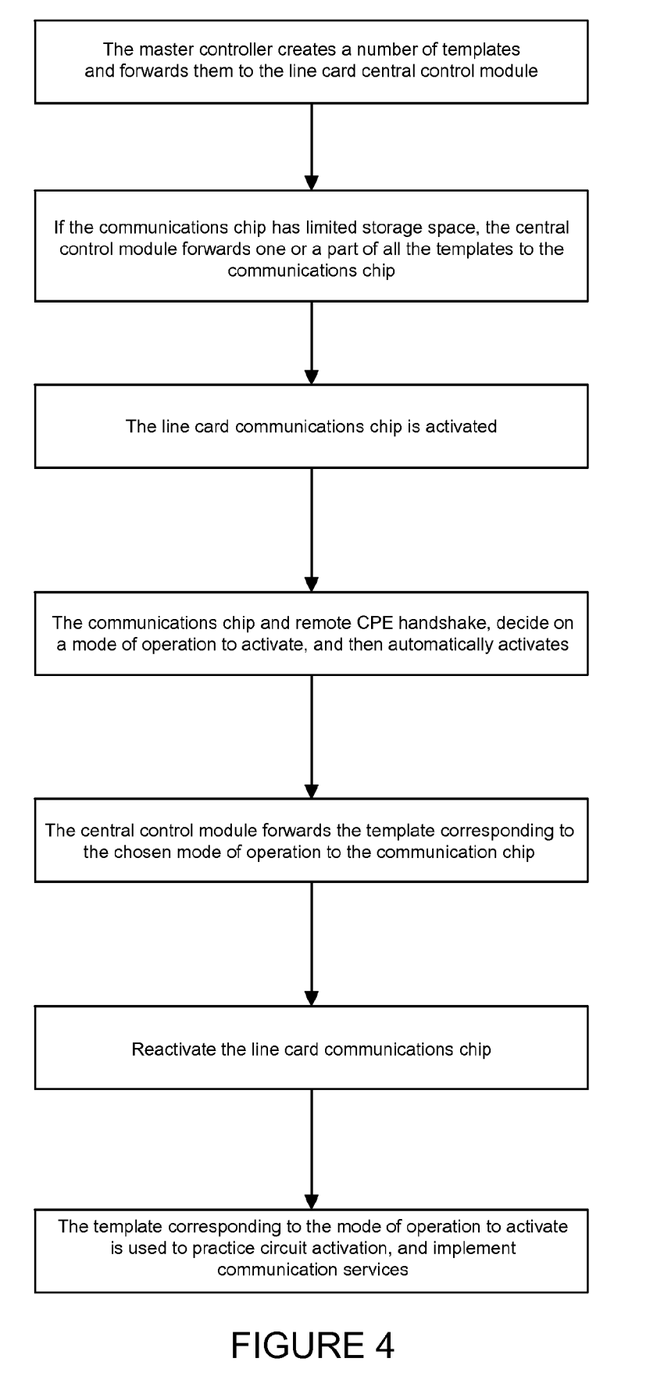
FIG. 4 is a process flow diagram for implementation example 2 of the method of this invention.

See FIG. 4 for a description of the implementation example described above:

In reference to the template creation process described in the above implementation example, if the master controller creates three templates, i.e. ADSL, ADSL2+ and VDSL template and the line card communications chip has limited storage space, the central control module forwards the ADSL template, from the three templates ADSL, ADSL2+ and VDSL, to the communications chip and sends an activation order to activate the line card communications chip described. When the remote CPE is already active, the communications chip and remote CPE initiate handshake negotiation to determine a mode of operation. For details of the line card and CPE handshaking process, see the G.hs handshake protocol and the implementation example described above; no further description shall be given here. Once the line card communications chip and remote CPE handshake and decide upon a mode of operation (e.g. VDSL), and once the communications chip reports the mode of operation decided to the central control module described and automatically activates, the central control module described obtains the template corresponding to the mode of operation decided, forwards it to the communications chip described and reactivates said communications chip. Subsequently, said communications chip and the remote CPE practice circuit activation according to said template and implement normal communications services. In this implementation example, if the line card communications chip and remote CPE handshake and decide upon the ADSL mode of operation, the communications chip does not need to report the mode of operation decided upon and directly implements circuit activation with said template and normal communications services.

In this implementation example, if the master controller creates four templates, comprising a common template and three special templates (ADSL, ADSL2+ and VDSL), when said communications chip has sufficient resources, the central control module forwards at least one of the three special templates and the common template together to the communications chip, sends an activation order to activate the line card communications chip described, and continues implementation of subsequent steps with the CPE in the same way described in the implementation example above.

To summarize the aforementioned, the method in this invention is an effective solution for resolving compatibility problems with multimode xDSL, as well as an expedient and cost-effective solution for both the network and user side.

Figure 5:
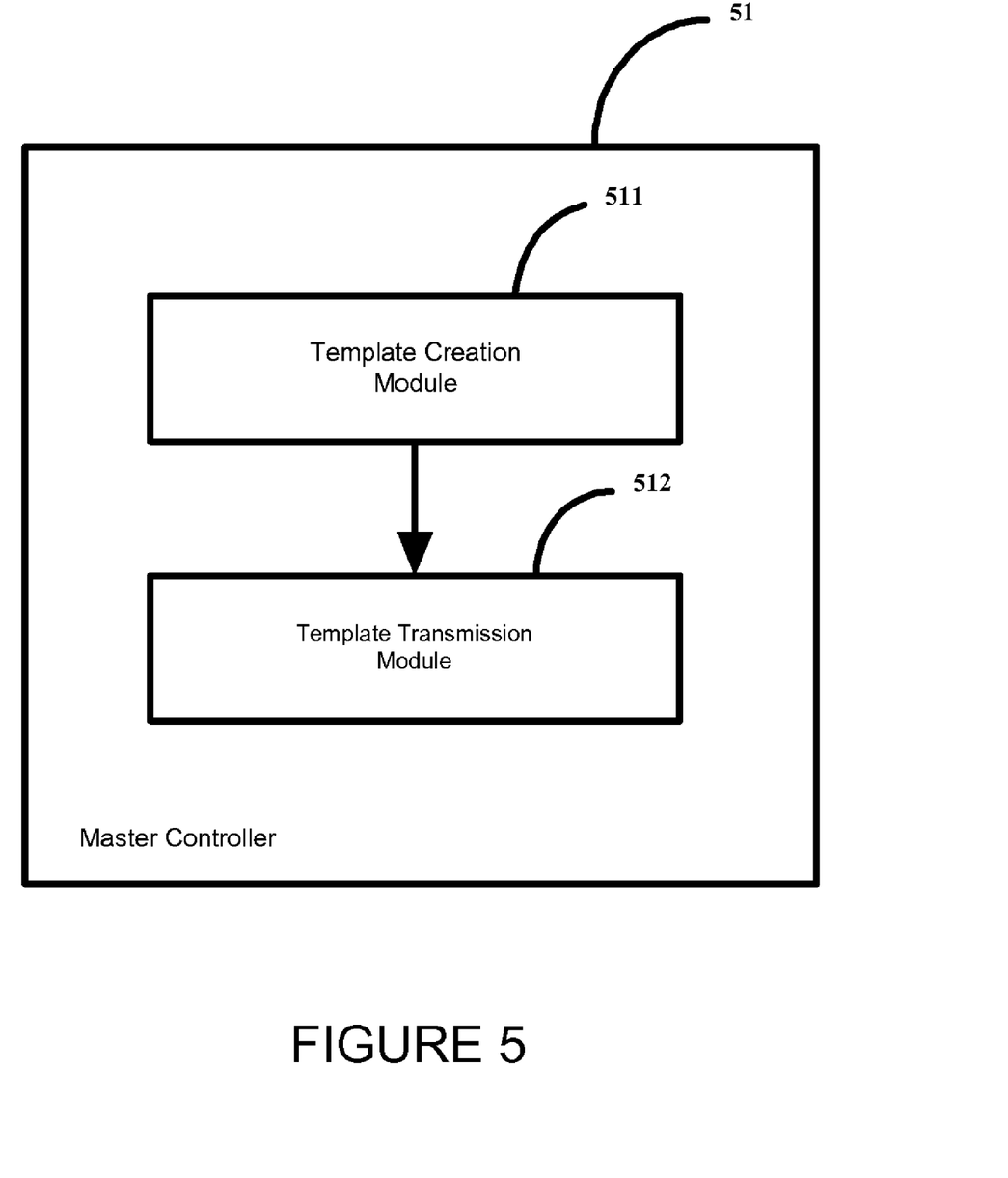
FIG. 5 is a structural diagram of the master controller in this invention.

This invention also presents a multimode xDSL master controller, see FIG. 5, comprising of at least: Template Creation Module (511), used to create corresponding template information for all modes of multimode xDSL line card; Template Transmission Module (512), used to transmit template information created by the Template Creation Module (511) and activate the line card (61).

Figure 6:
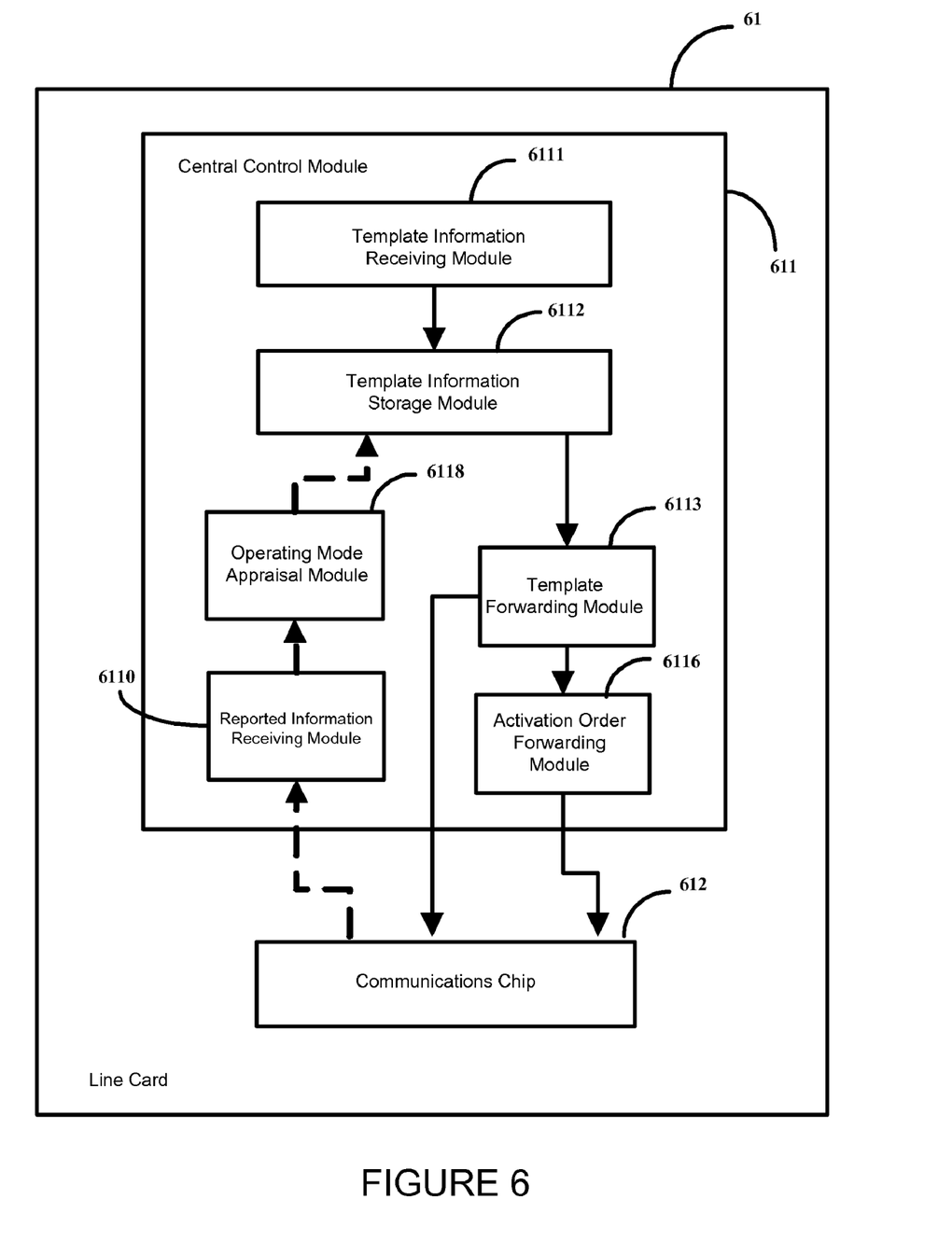
FIG. 6 is a structural diagram of the line card in this invention.

This invention also presents a multimode xDSL line card (61), see FIG. 6, comprising of at least a Central Control Module (611) and Communications Chip (612), of which: the Central Control Module (611) is used to receive template information forwarded by the Master Controller (51), generate activation orders and send these to the Communications Chip (612); the Communications Chip (612) is used to activate according to the activation order from the Central Control Module (611) and communicate with the CPE to decide on which template information to utilize.

The Central Control Module (611) of the Line Card (61) described in this invention comprises: Template Information Receiving Module (6111), used to receive template information forwarded by the Master Controller; Template Information Storage Module (6112), used to temporarily store template information received by the Template Information Receiving Module (6111); Template Forwarding Module (6113), creates activation orders according to communications chip storage space and forward received template information; Activation Order Forwarding Module (6116), used to receive activation orders generated by the Template Forwarding Module (6113) and forward said activation order. The Central Control Module (611) described also comprises: Reported Information Receiving Module (6110), used to receive operating mode information reported by the Communications Chip (612); Operating Mode Appraisal Module (6118), used to appraise the Communications Chip based on the operating mode information received by the Reported Information Receiving Module (6110). That is, the activated mode of operation in use is used to obtain the template information corresponding to said mode of operation from the Template Information Storage Module (6112) and said template is forwarded to the Communications Chip by the Template Forwarding Module (6113).

Wherein, said Template Forwarding Module (6113) comprises: Template Forwarding Module One, used to forward all received template information to the Communications Chip (612) described when the Communications Chip (612) has sufficient storage space, and generate activation orders; Template Forwarding Module Two, used to forward at least one set of received template information to the Communications Chip (612) described when the Communications Chip (612) has limited storage space, and generate activation orders. Said Communications Chip (612) comprises: Handshake Module, used to implement handshake negotiations with the remote CPE described and decide the mode of operation to activate; Communications Module, used to implement communications with the remote CPE described; Storage Module used to store template information forwarded by the Central Control Module.

Figure 7:
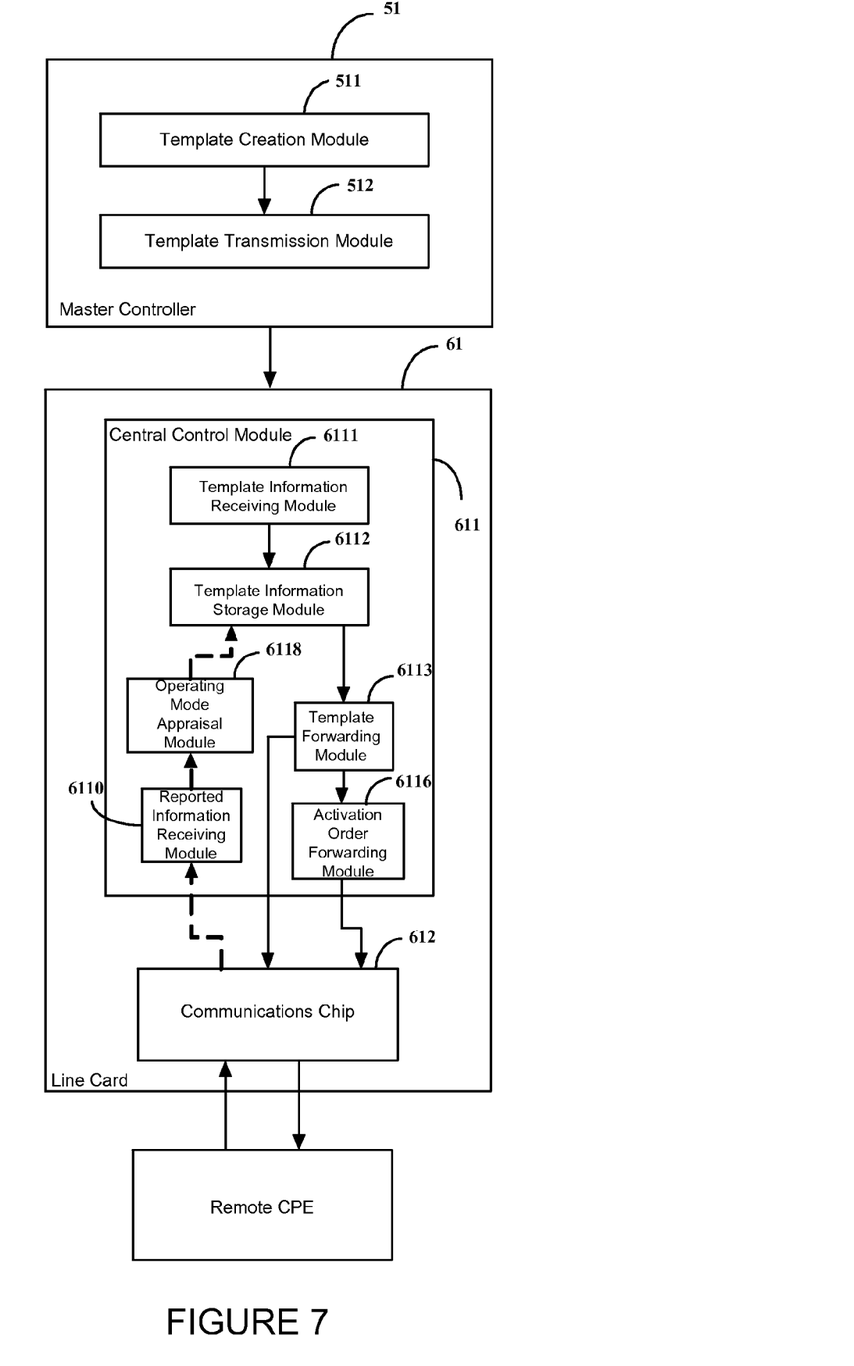
FIG. 7 is a structural diagram of the system in this invention.

This invention also presents an xDSL line card adaptive activation system, see FIG. 7, comprising local end xDSL transmitter receiver equipment and remote CPE. Said xDSL transmitter receiver is composed of the aforementioned Master Controller (51) and Line Card (61).

Based on the composition of the aforementioned it is obvious that, when using this system, first the Template Creation Module (511) in the Master Controller (51) creates multiple template information according to the modes of operation supported by line cards and sends these to the Line Card (61) described. Once the Template Information Receiving Module (6111) of the Line Card (61) Central Control Module (611) receives these template information, the template information is stored in the Template Information Storage Module (6112). The Template Forwarding Module (6113) forwards the templates received to the Communications Chip described according to the storage capacity of said Communications Chip (612). In this event, if the Communications Chip (612) has sufficient storage space, Template Transmission Module One of the Template Forwarding Module (6113) forwards all the received template information to the Communications Chip described and generates an activation order which is forwarded to said Communications Chip (612) by the Activation Order Forwarding Module (6116); if the Communications Chip (612) described has limited storage space, Template Transmission Module Two of the Template Forwarding Module (6113) forwards one set or part of the received template information to the Communications Chip described and generates an activation order which is forwarded to said Communications Chip (612) by the Activation Order Forwarding Module (6116);

When the Communications Chip (612) described receives template information sent by Template Transmission Module One, the Communications Chip is activated and the template information received is stored in the storage module; The Communications Chip (612) Handshake Module communicates with remote CPE, decides on a mode of operation to activate according to negotiations made using the G.hs handshake protocol, and then automatically activates. The line card and remote CPE obtain the corresponding template from the Communications Chip (612) Storage Module according to the operating mode described, implements circuit activation practice, and subsequently the Communications Module of the Communications Chip (612) and remote CPE establish normal communication services;

When the Communications Chip (612) receives one set or part of the template information from Template Transmission Module Two, the Communications Chip is activated and the template information received is stored in the storage module; The Communications Chip (612) Handshake Module communicates with remote CPE, decides on a mode of operation to activate according to negotiations made using the G.hs handshake protocol, and then automatically activates. The Communications Chip (612) reports the decided mode of operation to the Reported Information Receiving Module (6110) in the Central Control Module (611), then the Operating Mode Appraisal Module (6118) appraises the mode of Communications Chip operation to activate based on said reported information (chosen mode of operation), obtains the corresponding template for said mode of operation from the Communications Chip Storage Module (6112); either Template Forwarding Module One or Module Two of the Template Forwarding Module (6113) then forwards said template information to the Communications Chip (612), and reactivates said Communications Chip (612). The Line Card Communications Chip (612) and CPE implements circuit activation practice based on said template and finally the Communications Module of the Communications Chip (523) and remote CPE establish normal communication services.

To summarize the aforementioned, the system of this invention resolves line card compatability problems in the existing technology, is easy to use for providers and users and reduces costs.

Clearly, technical staff in this field can modify and alter this invention without departing from its spirit and scope. In this event, if these alterations and modification are encompassed within the scope of these patent claims and its equivalent technology, it is implied that this invention also comprises said alterations and modifications.

What is claimed is:

1. A multimode xDSL line card adaptive activation method, comprising the following steps:

A. a master controller installing multiple templates based on modes of operation supported by a line card, and forwarding the templates to the line card;

B. the line card receiving the templates forwarded by the master controller and activating a communications chip of the line card, wherein when the communications chip of said line card has sufficient storage space, a central control module of said line card is configured to transfer all of the received templates to the communications chip of said line card and activate said communications chip;

C. the communications chip communicating with a remote CPE and determining a mode of operation for activation according to a handshake protocol; and D. the line card, employing a corresponding template according to the mode of operation determined in Step C, practicing a circuit activation with the CPE.

2. The method in accordance with claim 1, wherein in step B:

when the communications chip of said line card has limited storage space, a central control module of said line card forwarding at least one of the received multiple templates to the communications chip of said line card and activating said communications chip.

3. The method in accordance with claim 2, comprising, between step C and step D:

C1. said communications chip reporting the mode of operation for activation determined in step C to the central control module of said line card;

C2. said central control module forwarding the corresponding template for said mode to said communications chip according to the mode of operation for activation, and reactivating said communications chip.

4. A multimode xDSL line card, comprising at least a central control module and a communications chip, wherein:

the central control module is used to receive template information forwarded by a master controller and generate an activation order to send to the communications chip, wherein the central control module comprises:

a template information receiving module, used to receive template information forwarded by a master controller;

a template information storage module, used to store the template information received by the template information receiving module;

a template forwarding module, generating an activation order according to storage space of the communications chip and forwarding the received template information, wherein the template forwarding module comprises a first template forwarding module, used to forward all received template information to said communications chip when the communications chip has sufficient storage space, and to generate the activation order;

a second template forwarding module, used to forward at least one of the received template information to said communications chip when the communications chip has limited storage space, as well as generating the activation order; and an activation order forwarding module, used to receive the activation order generated by the template forwarding module and forwarding said activation order; and the communications chip is used to activate according to the activation order of the central control module and communicate with a remote CPE to determine template information to apply.

5. The line card according to claim 4, wherein said central control module further comprises:

a reported information receiving module, used to receive operating mode information reported by the communications chip;

an operating mode appraisal module, used to appraise an operating mode activated by the communications chip according to the operating mode information received by the reported information receiving module, and obtain corresponding template information for said operating mode from the template information storage module; said template forwarding module forwarding said template to the communications chip.

6. The line card according to claim 4, wherein said communications chip comprises:

a handshake module, used to handshake and negotiate with said remote CPE, and determine an operating mode for activation;

a communications module, used to perform communication services with said remote CPE;

a storage module, used to store the template information forwarded by the central control module.

7. A multimode xDSL adaptive activation system, comprising an xDSL receiving and transmitting device and a remote CPE, wherein said xDSL receiving and transmitting device includes a master controller and a line card, wherein:

the master controller includes:

a template creation module, used to create template information corresponding to each mode of operation for the multimode xDSL line card;

a template transmission module, used to transmit template information created by the template creation module and activate the line card;

the line card includes a central control module and a communications chip, wherein:

the central control module is used to receive template information forwarded by the master controller and generate an activation order to send to the communications chip, wherein said central control module comprises:

a template information receiving module, used to receive the template information forwarded by the master controller;

a template information storage module, used to store the template information received by the template information receiving module;

a template forwarding module, generating the activation order according to storage space of the communications chip and forwarding the received template information, wherein said template forwarding module comprises:

a first template forwarding module, used to forward all received template information to said communications chip when the communications chip has sufficient storage space, as well as to generate the activation order; and a second template forwarding module, used to forward at least one of the received template information to said communications chip when the communications chip has limited storage space, as well as generating the activation order; and an activation order forwarding module, used to receive the activation order generated by the template forwarding module and forwarding said activation order; and the communications chip is used to activate according to the activation order of the central control module and communicate with the remote CPE to determine template information to apply.

8. The system according to claim 7, wherein said central control module further comprises:

a reported information receiving module, used to receive operating mode information reported by the communications chip;

an operating mode appraisal module, used to appraise an operating mode activated by the communications chip according to the operating mode information received by the reported information receiving module, and obtain corresponding template information for said operating mode from the template information storage module; said template forwarding module forwarding said template to the communications chip.

9. The system according to claim 7, wherein said communications chip comprises:

a handshake module, used to handshake and negotiate with said remote CPE, and determine an operating mode for activation;

a communications module, used to perform communication services with said remote CPE;

a storage module, used to store the template information forwarded by the central control module.

* * * * *